(12) United States Patent
Kanai

(10) Patent No.: US 6,687,068 B2
(45) Date of Patent: Feb. 3, 2004

(54) DATA REPRODUCTION APPARATUS AND METHOD

(75) Inventor: Toshio Kanai, Moriyama (JP)

(73) Assignee: International Business Machines Corporation, Armonk, NY (US)

( * ) Notice: Subject to any disclaimer, the term of this patent is extended or adjusted under 35 U.S.C. 154(b) by 4 days.

(21) Appl. No.: 10/099,796

(22) Filed: Mar. 15, 2002

(65) Prior Publication Data

US 2002/0141093 A1 Oct. 3, 2002

(30) Foreign Application Priority Data

Mar. 27, 2001 (JP) ........................................ 2001-089642

(51) Int. Cl.[7] ............................................... G11B 5/09
(52) U.S. Cl. ........................................... 360/46; 360/51
(58) Field of Search ............................... 360/25, 77, 46, 360/77.04, 51; 369/53

(56) References Cited

U.S. PATENT DOCUMENTS

| | | | | |
|---|---|---|---|---|
| 5,136,391 A | * | 8/1992 | Minami | 386/33 |
| 5,218,486 A | * | 6/1993 | Wilkinson | 360/27 |
| 5,280,394 A | * | 1/1994 | Murabayashi et al. | 360/27 |
| 5,311,493 A | * | 5/1994 | Fuji | 369/59.18 |
| 5,493,552 A | * | 2/1996 | Kobori | 369/109.02 |
| 5,870,591 A | * | 2/1999 | Sawada | 713/500 |
| 5,969,894 A | * | 10/1999 | Howell et al. | 360/51 |
| 6,307,822 B1 | * | 10/2001 | Shim et al. | 369/47.18 |
| 6,532,122 B1 | * | 3/2003 | Sugawara et al. | 360/46 |

* cited by examiner

*Primary Examiner*—David Hudspeth
*Assistant Examiner*—Glenda P. Rodriguez
(74) *Attorney, Agent, or Firm*—Ronald Feece; Bracewell & Patterson, L.L.P.

(57) ABSTRACT

A method and system for reproducing digital data read from a storage device. A second-order differentiation of a digital signal representing the digital data is calculated to control an automatic gain control (AGC) and phase lock loop (PLL) to rapidly correct amplitude and frequency offset of the digital signal being read from the storage device.

10 Claims, 7 Drawing Sheets

DATA REPRODUCTION APPARATUS AND METHOD

BACKGROUND OF THE INVENTION

1. Technical Field

The present invention relates to an apparatus for reproducing data from a data recording medium and a method thereof. More particularly, it relates to an apparatus and a method for reproducing data in which rates of convergence for errors in amplitude and frequency of a signal read from the data recording medium are dynamically controlled to remove offset in the read signal.

2. Description of Related Art

Typical examples of recording media for storing data, such as documents, images, and sound are a magnetic disk HDD (Hard Disk Drive), a DVD (Digital Video Disk or Digital Versatile Disk), an MO (Magneto-optic Disk), a CD (Compact Disk), and an LD (Laser Disk), or the like. FIG. 5(a) shows an outline of a data reproduction apparatus 70 for reproducing digital data from a medium 72. A read signal read from the medium 72 is digitized with a level determining unit 74 to be converted to a bit string (binary data) composed of 0's and 1's. The binary data is sent to a decoder 76 to be reproduced. For example, as shown in FIG. 5(b), synchronization marks (Sync) for synchronization, address marks (AM), and data (DATA) are recorded in the medium 72.

FIG. 5(c) shows an example of the structure of the level determining unit 74. An automatic gain control (AGC) circuit 82 maintains a constant amplitude of a read signal read from medium 72. An AGC output signal V(t) of constant amplitude is sent to a zero cross detector 84. For example, the zero cross detector 84 defines a threshold level (slicing level) Vr, as shown in FIG. 6, based on the maximum and minimum values of the read signal V(t) to detect intersections (Pz0-1,2,3,4) of the output signal V(t) and the slicing level Vr. Subsequently, the zero cross detector 84 sends a detection signal Z0 indicative of the intersections to a binarization circuit 86. The binarization circuit 86 defines time cells having a period determined by the frequency of the output signal V(t) detected by a phase-locked loop circuit (PLL) 88 to generate binary data based on presence or absence of the intersections Pz0-1,2,3,4 (Time Tz0-1,2,3,4) in each time cell.

The AGC circuit 82 keeps the amplitude of the output signal V(t) at a predetermined amplitude A0 regardless of fluctuations of frequency in an input signal. The amplitude is controlled as a function of voltage $\alpha$Vca ($\alpha$ is a set value), which is proportional to an error or difference between the amplitude of the output signal V(t) and the predetermined amplitude A0. $\alpha$ can be adjusted by controlling the gain of an amplifier to amplify the voltage Vca. $\alpha$ is hereinafter referred to as a "feedback gain" of the AGC circuit 82.

PLL 88 defines time cells having a period determined by the frequency of the output signal V(t). The period is controlled as a function of voltage $\beta$Vcp ($\beta$ is a set value), which is proportional to an error or difference between the frequency of the output signal V(t) and the frequency of the time cells (a reciprocal of the cycle). $\beta$ can be adjusted by controlling the gain of an amplifier to amplify the voltage Vcp. $\beta$ is hereinafter referred to as a "feedback gain" of PLL 88.

When both feedback gains $\alpha$ and $\beta$ of the AGC circuit 82 and PLL 88 are set high, sensitivity to errors becomes higher because of high amplification of the errors, so that the rate of convergence of the errors becomes faster. On the contrary, when $\alpha$ and $\beta$ are set low, the sensitivity to the errors becomes lower because of low amplification, so that the convergence rates become slower.

At early stages of operation of the AGC circuit 82 and PLL 88, feedback gains a and b are set high to converge the errors rapidly. When operation is stabilized by the convergence of the errors, the feedback gains a and b are lowered to prevent malfunction caused by disturbance. Signals AGC-H/L and PLL-H/L outputted from a timer circuit 80 respectively switch the feedback gains a and b of the AGC circuit 82 and PLL 88. The timer circuit 80 gives an instruction to operate at a high feedback gain during the early stages of the operation. After a lapse of a predetermined time, the timer circuit 80 gives an instruction to operate at a low feedback gain. The rate of error convergence is proportional to the feedback gains.

For example, as a dot-dash-line in FIG. 7(a) shows, a feedback gain is initially set to High to rapidly converge the error and then the feedback gain is set to Low. However, when noise is originated immediately before switching the setting of the feedback gain from High to Low, as a solid line in FIG. 7(a) shows, the error is caused to converge slowly due to a low feedback gain. There is a possibility that the convergence of the error is not completed when an address mark (AM) is read due to the slow rate of convergence. Unless the convergence of the error has been completed, data may be unable to be read.

As shown in FIG. 7(b), there may be used a data recording format with repeated recording of synchronization and address marks to allow for the convergence time in the existence of noise. This data recording format wastes recording capacity because of overlapped recording of synchronization and address marks.

When an MR (Magneto resistive) head is used for a read/write head of hard disk, heat generation caused by a touch of the MR head on the surface of a magnetic disk changes magneto resistance. The changes in magneto resistance cause noise called "Thermal Asperity". Graphed as a dotted line in FIG. 2(a), thermal asperity can be approximated by $e^{-t/\tau}$ ($\tau$ is a constant). A shift is caused by the thermal asperity at an intersection of the output signal V(t) and the slicing level Vr.

Since thermal asperity lasts until the heated MR head has returned to its original temperature, it takes a long time to converge the shift. As shown in FIG. 5(c), the level determining unit 74 generates an error correcting code (ECC) at the time of binarizing the read signal to send it to the decoder 76. The error correction circuit 78 in the decoder 76 corrects errors in binary data using ECC. The error convergence time often, however, may be so long that ECC cannot work and thus data errors cannot be corrected using ECC.

It is an object of the present invention to rapidly correct offset of a read signal which may cause data errors.

SUMMARY OF THE INVENTION

A data reproduction apparatus according to the present invention includes a differentiating circuit for second-order differentiating an output signal outputted from an automatic gain control (AGC) circuit which receives a read signal read from a data recording medium; an arithmetic circuit for determining a time difference between a first intersection Pz0 (Time Tz0) of the output signal and a slicing level, and a second intersection Pz2 (Time Tz2) of the second-order differentiated signal and a zero level; a comparison circuit for comparing the determined time difference with a predetermined time to obtain a comparison value; and means responsive to the comparison circuit for controlling the setting of a rate of convergence for an error between the amplitude of the output signal of the AGC circuit and a predetermine amplitude, and the setting of a rate of convergence for an error between the frequency determined by the period of a time cell defined by a phase-locked loop circuit (PLL) and the frequency of the output signal from the AGC circuit.

A data reproducing method according to the present invention includes the steps of: second-order differentiating an output signal outputted by an AGC circuit; detecting a second intersection Pz2 of the second-order differentiated signal and a zero level; determining a time difference between a first intersection Pz0 of the output signal and a slicing level, and the second intersection Pz2; comparing the determined time difference with a predetermined time to obtain a comparison value; and controlling a rate of convergence for an error between the amplitude of the output signal from the AGC circuit and a predetermined amplitude, and a rate of convergence for an error between the frequency determined by the period of a time cell defined by PLL and the frequency of the output signal from the AGC circuit based on the comparison value.

DESCRIPTION OF THE PREFERRED EMBODIMENT

Figure 1A:
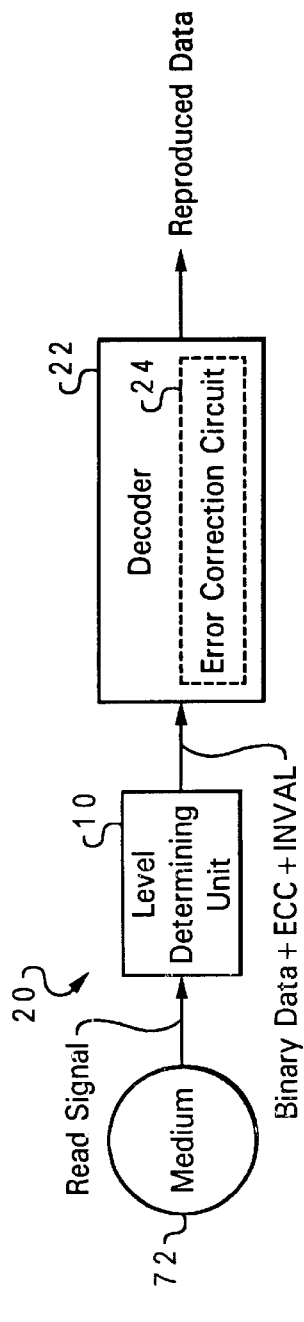
FIG. 1(a) is a block diagram showing an example of the structure of a data reproduction apparatus according to the present invention.
Figure 1B:
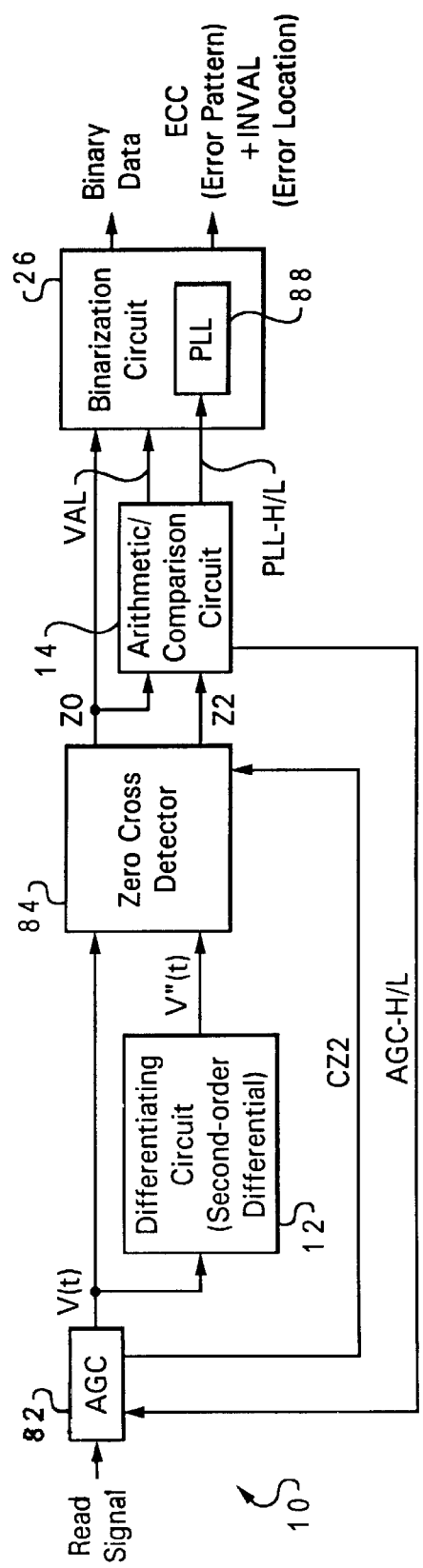
FIG. 1(b) is a block diagram showing an example of the structure of a level determining unit shown in FIG. 1(a).

With reference now to FIG. 1(a), a data reproduction apparatus 20 of the present invention includes a level determining unit 10 for binarizing a read signal read from a medium 72; and a decoder 22 for decoding binary data. As shown in FIG. 1(b), the level determining unit 10 includes an automatic gain control (AGC) circuit 82 for retaining the amplitude of the read signal at a predetermined value A0; a zero cross detector 84 for detecting a first intersection Pz0 of the output signal V(t) outputted from the AGC circuit 82 and a predetermined threshold level (Slicing level) Vr; and a binarization circuit 26 for generating binary data based on presence or absence of the intersection Pz0 in each time cell. The binarization circuit 26 includes a phase-locked loop circuit (PLL) 88 for defining time cells having a period determined by the frequency of the output signal V(t).

The level determining unit 10 further includes a differentiating circuit 12 for obtaining a second-order differential V''(t) of the output signal V(t) outputted from the AGC circuit 82; and an arithmetic/comparison circuit 14. The second-order differentiated signal V''(t) from the differentiating circuit 12 is sent to the zero cross detector 84. The zero cross detector 84 detects a second intersection Pz2 of the second-order differentiated signal V''(t) and a zero level. After detecting the intersection Pz2, a detection signal Z2 is sent to the arithmetic/comparison circuit 14. A detection signal Z0 indicative of the intersection Pz0 of the output signal V(t) and the slicing level Vr is also sent to the circuit 14 by the zero cross detector 84.

As shown in FIG. 1(b), the arithmetic/comparison circuit 14 functions as an arithmetic circuit for determining a time difference $\Delta T(=|Tz0-Tz2|)$ between the intersection Pz0 (Time Tz0) and the intersection Pz2 (Time Tz2) detected by the zero cross detector 84, a comparison circuit for comparing the determined time difference $\Delta T$ with a predetermined time dT to obtain a comparison value, and means for controlling the setting of a rate of convergence for an error between the amplitude of the output signal V(t) of the AGC circuit 82 and the predetermined amplitude A0, and the setting of a rate of convergence for an error between the frequency determined by the period of the time cells defined by PLL 88 and the frequency of the output signal V(t) based on the comparison value.

Figure 2A:
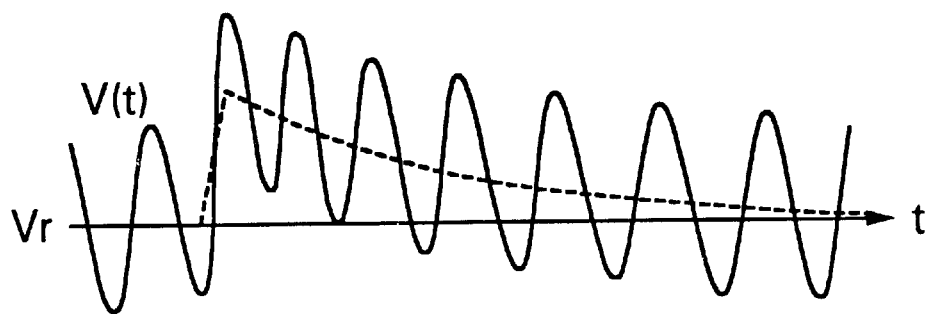
FIG. 2(a) shows an outline of noise caused by thermal asperity.
Figure 2B:
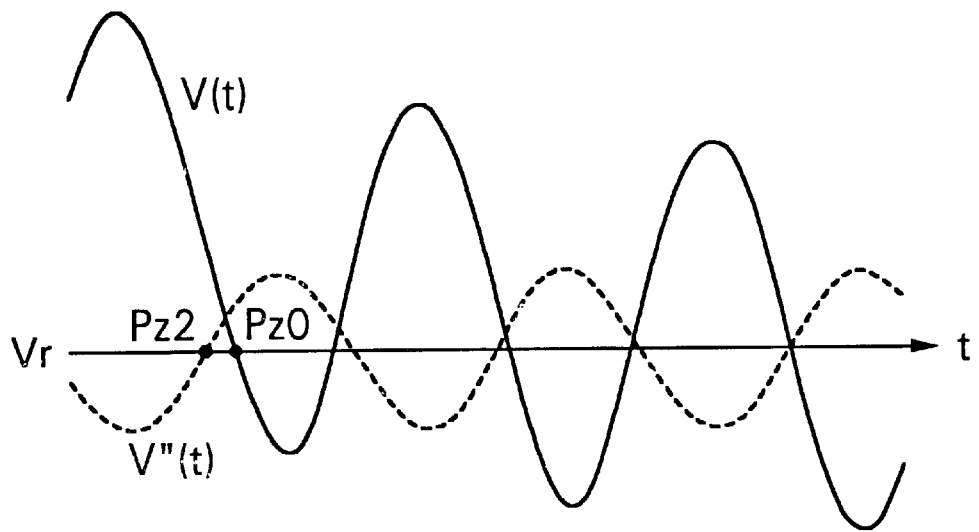
FIG. 2(b) shows waveforms of outputs from an AGC circuit and a second-order differentiating circuit.

In the case of the second-order differentiated waveform V''(t) shown in FIG. 2(b), the slicing level Vr is assumed to be a zero level. Feedback gain α of the AGC circuit 82 is controlled to adjust the rate of convergence of an error between the amplitude of the output signal V(t) of the AGC circuit 82 and the predetermined amplitude A0. A feedback gain β of PLL 88 is also controlled to adjust the rate of convergence of an error between the frequency determined by the period of the time cells and the frequency of the output signal V(t).

The arithmetic/comparison circuit 14 detects the occurrence and convergence of offset in the read signal based on the result of comparison between the time difference $\Delta T$ and the predetermined time dT. For example, the occurrence and convergence of offset may be detected based on comparison results obtained in the current comparison and previous two consecutive comparisons. The arithmetic/comparison circuit 14 includes a memory (not shown) for storing the comparison values obtained in the previous two comparisons. When the current and previous two comparisons all indicate $\Delta T=|Tz0-Tz2|>dT$, the occurrence of offset is detected. When two or more comparisons out of the current comparison and the previous two comparisons indicate $\Delta T=|Tz0-Tz2|<dT$, the convergence of offset is detected.

The predetermined time dT is set based on variations of the time difference $\Delta T$ predicted to cause malfunction of PLL 88. PLL 88 can follow variations in frequency of the output signal V(t), as long as the time difference $\Delta T$ does not exceed a value D. When the time difference $\Delta T$ varies, however, beyond the value D, PLL 88 will malfunction. The predetermined time dT may be set to such a value D.

When the occurrence or the convergence of offset is detected, the arithmetic/comparison circuit 14 gives an instruction to change the feedback gain α of the AGC circuit 82 and/or the feedback gain β of PLL 88. The feedback gain α of the circuit 82 is controlled by a signal AGC-H/L (Automatic Gain Control—High/Low) to be sent from the circuit 14 to the circuit 82. The feedback gain β of PLL 88 is controlled by a signal PLL-H/L (Phase Lock Loop-High/Low) to be sent from the circuit 14 to PLL 88.

The arithmetic/comparison circuit 14 sets the feedback gain of the AGC circuit 82 to a high gain at the early stages of inputting the read signal. Upon detection of the convergence of offset in a state that the circuit 82 operates at the high feedback gain, the circuit 14 gives the circuit 82 an instruction to operate at a feedback gain lower than the high gain and further gives PLL 88 an instruction to operate at a high feedback gain. In addition, the arithmetic/comparison circuit 14 gives PLL 88 an instruction to operate at a feedback gain lower than the high gain after a predetermined time TR has elapsed since the feedback gain of PLL 88 is switched to the high gain. The predetermined time TR is set according to the time required to synchronize the frequency of the time cells and the frequency of the output signal V(t). PLL 88 completes the synchronization in frequency between the time cells and the output signal V(t) within the time TR.

Upon detection of the convergence of offset caused while the AGC circuit 82 and PLL 88 respectively operate at low feedback gains, the arithmetic/comparison circuit 14 gives PLL 88 an instruction to operate at a feedback gain higher than the low gain. After the predetermined time TR has elapsed since the feedback gain of PLL 88 is switched to the high gain, the arithmetic/comparison circuit 14 gives PLL 88 an instruction to operate at a low feedback gain.

When offset occurs in a state that the AGC circuit 82 and PLL 88 respectively operate at low feedback gains, the arithmetic/comparison circuit 14 sends a signal INVAL indicating that binary data is invalid to the binarization circuit 26. When thermal asperity occurs in a state that the AGC circuit 82 and PLL 88 operate at low feedback gains, the amplitude and the frequency is abnormal. The signal INVAL indicates that the read signal is in an abnormal state, so that the signal can be used as error correction information. The decoder 22 corrects errors in binary data in response to an error correcting code (ECC) and signal INVAL.

The AGC circuit 82 sends a signal CZ2 to nullify the detection of the intersection Pz2 on the basis of the waveform of the read signal to the zero cross detector 84. For example, the intersections Pz0 other than those detected near the intermediate level of a peak to peak value of the read signal are nullified.

Next, a description will be given to the operation of data reproduction using this data reproduction apparatus 20.

The AGC circuit 82 adjusts the amplitude of the read signal read from the medium 72 to the predetermined amplitude A0 and then the zero cross detector 84 detects the intersections Pz0 of the output signal V(t) and the slicing level Vr. Subsequently, PLL 88 defines time cells having a period determined by the frequency of the output signal V(t), so that the binarization circuit 26 generates binary data based on presence or absence of the intersection Pz0 in each time cell.

Figure 3:
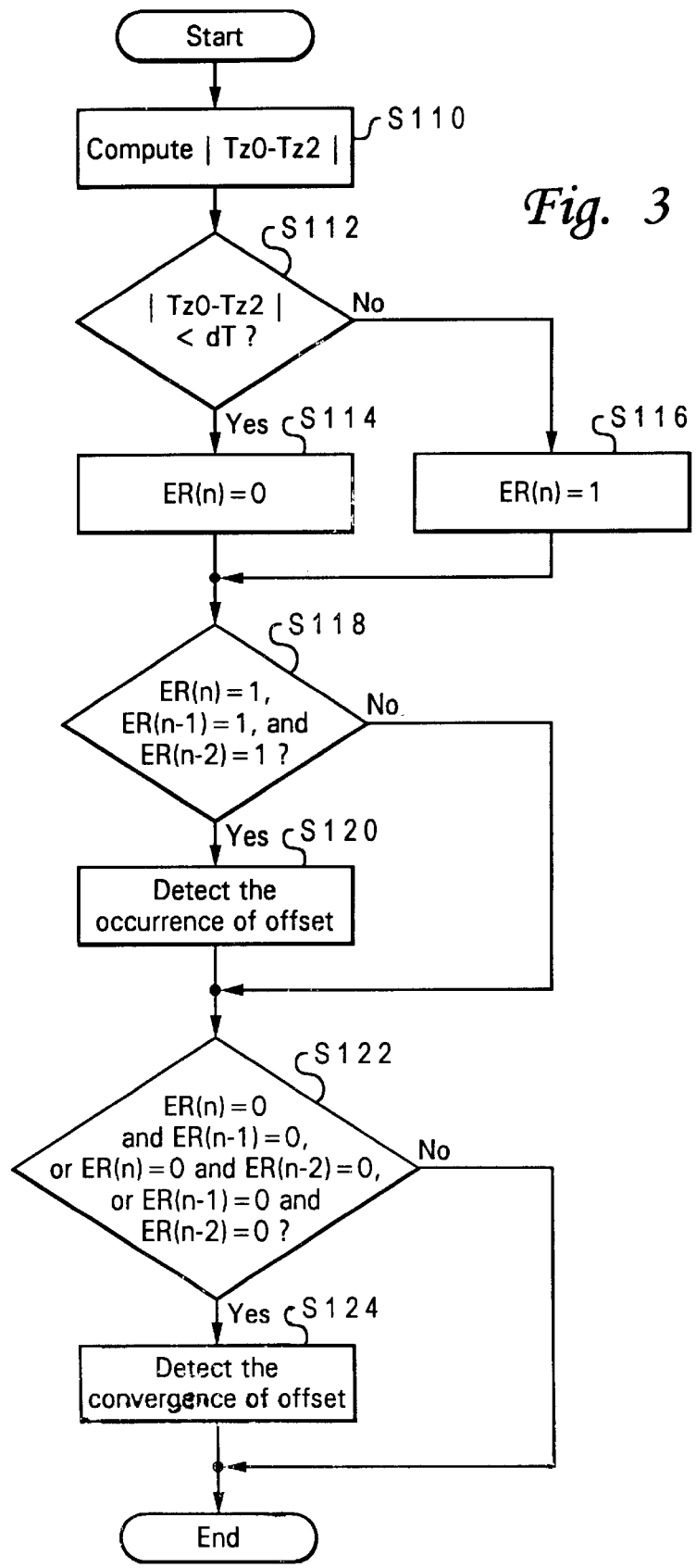
FIG. 3 is a flow chart showing the detection procedure of occurrence and convergence of offset.

In the present invention, the feedback gain α of the AGC circuit 82 and the feedback gain β of PLL 88 are changed according to occurrence or convergence of offset of the read signal. FIG. 3 shows an example of the detection procedure of the occurrence or the convergence of offset. The occurrence or the convergence of offset is detected based on a time difference between the intersection Pz0 (Time Tz0) of the output signal V(t) and the slicing level Vr, and the intersection Pz2 (Time Tz2) of the second-order differential V''(t) of the output signal V(t) and the zero level.

The differentiating circuit 12 second-order differentiates the output signal V(t) outputted from the AGC circuit 82 to produce the second-order differentiated signal V''(t). The zero cross detector 84 detects the intersection Pz2 of the second-order differentiated signal V''(t) and the zero level, as shown in FIG. 2(*b*). The AGC circuit 82 sends the signal CZ2 for nullifying the detection of the intersection Pz2 to the zero cross detector 84. The signal CZ2 can nullify the intersection Pz2, for example, detected in a noise portion adjacent to the peak of the output signal V(t).

The arithmetic/comparison circuit 14 determines the time difference ΔT between the intersection Pz0 (Time Tz0) and the intersection Pz2 (Time Tz2) (S110). The arithmetic/comparison circuit 14 compares the determined time difference ΔT with the predetermined time dT (S112).

If $\Delta T=|Tz0-Tz2|<dT, ER(n)=0$ (S114).

If $\Delta T=|Tz0-Tz2|>dT, ER(n)=1$ (S116).

The above ER(n) represents a comparison value obtained in the current comparison. For example, ER (n−1) indicates the comparison value which was obtained in the previous comparison and ER (n−2) indicates the comparison value which was obtained in the comparison before the previous comparison.

The arithmetic/comparison circuit 14 detects the occurrence and convergence of offset of the read signal based on the current comparison value ER(n) and the comparison values ER (n−1) and ER (n−2) respectively obtained twice in the past. When all of the comparison values are 1 (S118), it is assumed that the occurrence of offset is detected (S120). When two or more comparison values are 0 (S122), it is assumed that the convergence of offset is detected (S124).

Figure 4:
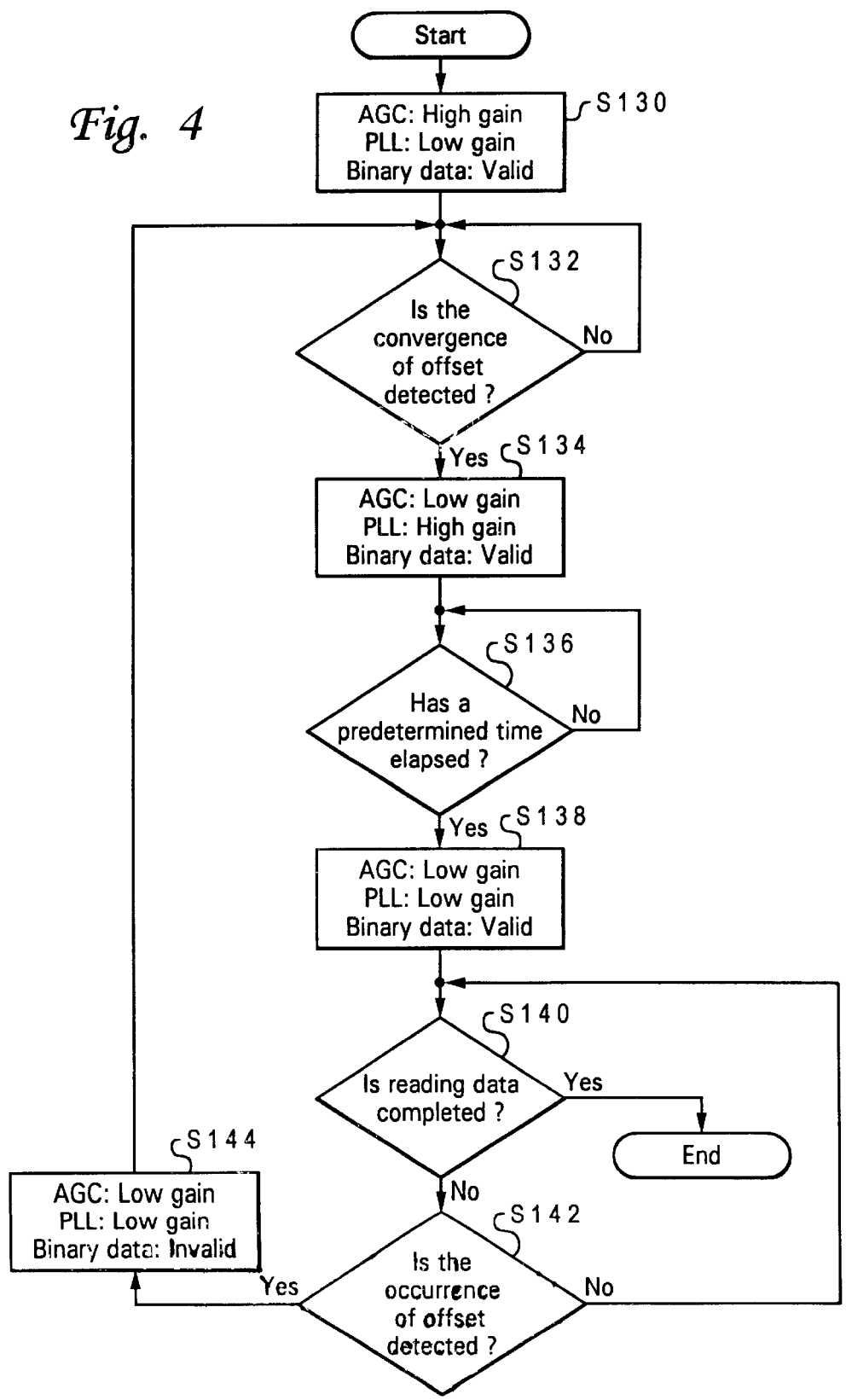
FIG. 4 is a flow chart showing the change procedure of feedback gains of an AGC circuit and PLL.
Figure 5A:
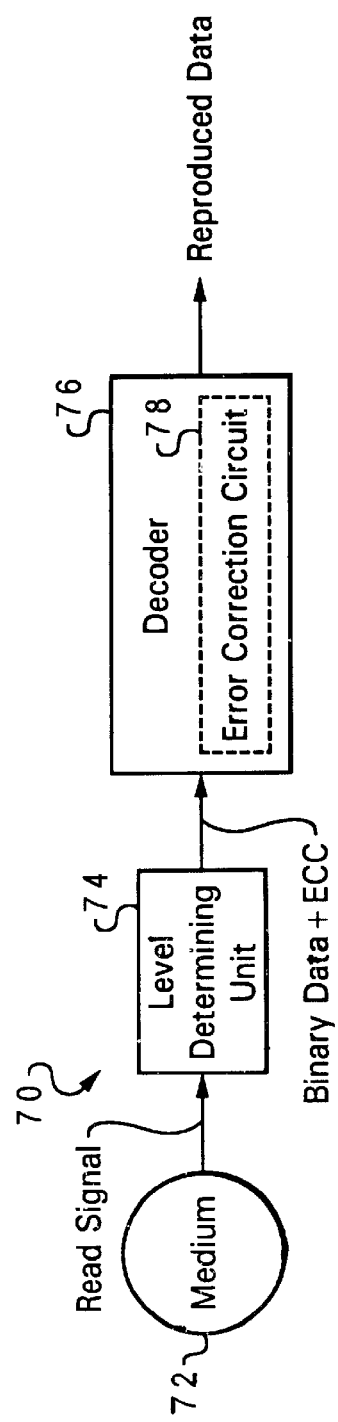
FIG. 5(a) is a block diagram showing an example of the structure of a conventional data reproduction apparatus.
Figure 5B:
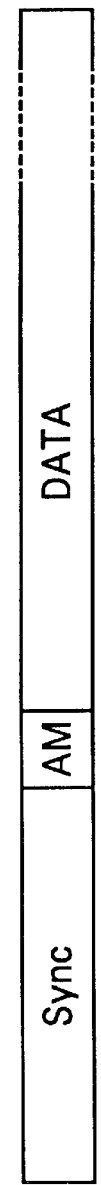
FIG. 5(b) is a figure showing an example of a data recording format of a medium.
Figure 5C:
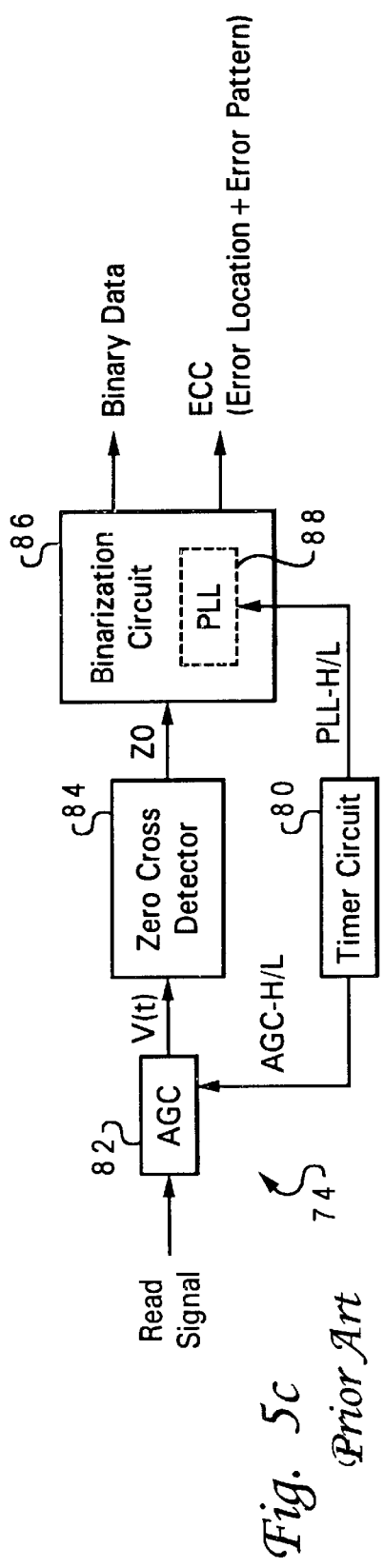
FIG. 5(c) is a block diagram showing an example of the structure of a level determining unit shown in FIG. 5(a).
Figure 6:
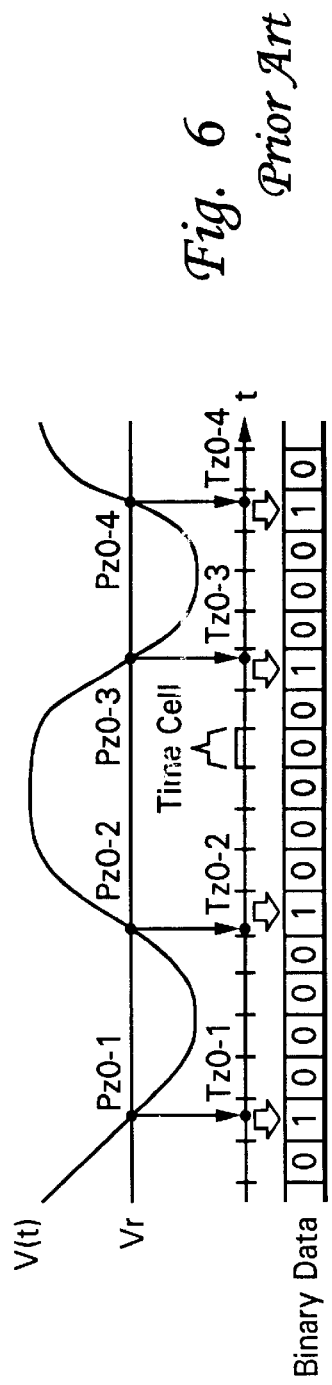
FIG. 6 is an graph of generation of binary data.
Figure 7A:
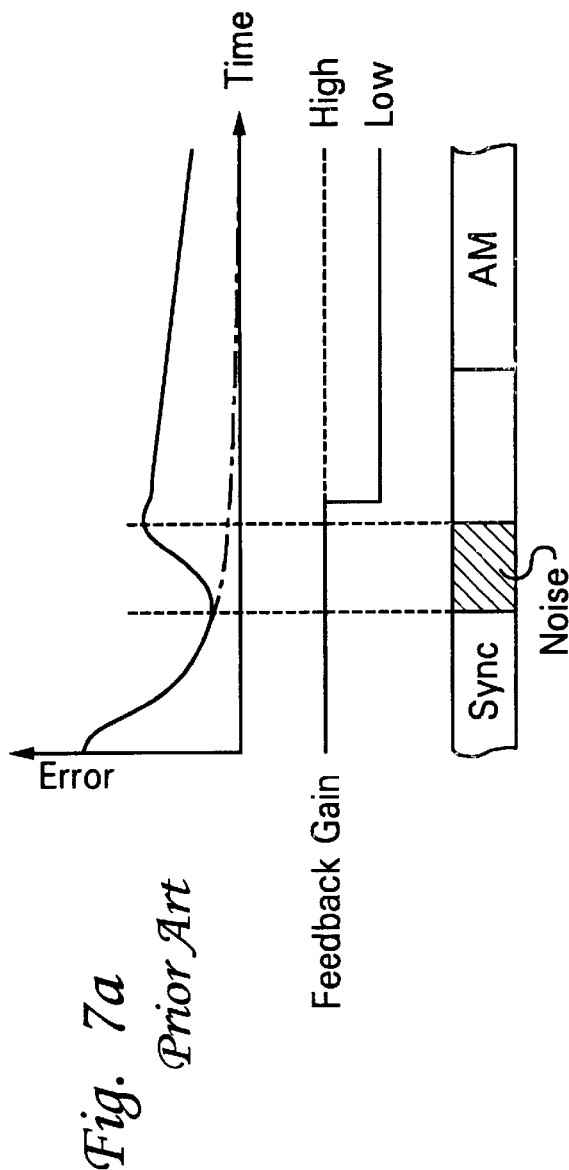
FIG. 7(a) shows an example of convergence of an error.
Figure 7B:
FIG. 7(b) shows another example of a data recording format of a medium.

Upon detection of the occurrence or the convergence of offset, the arithmetic/comparison circuit 14 changes the feedback gain α of the AGC circuit 82 and/or the feedback gain β of PLL 88. FIG. 4 shows the change procedure of the feedback gain a of the AGC circuit 82 and the feedback gain β of PLL 88.

Since the amplitude of the read signal is required to be adjusted to the predetermined amplitude A0 rapidly in an early stage of data reproduction, the feedback gain of the AGC circuit 82 is set to High (S130). The feedback gain of PLL 88 is set to Low, so that binary data is valid. Upon detection of the convergence of offset in a state that the circuit 82 operates at the high feedback gain (S132), the arithmetic/comparison circuit 14 gives the circuit 82 an instruction to operate at a feedback gain lower than the high gain (S134). The amplitude of the output signal V(t) outputted from the circuit 82 at this time is stable.

After stabilization of the amplitude of the output signal V(t), the arithmetic/comparison circuit 14 gives PLL 88 an instruction to operate at a high feedback gain to synchronize the frequency determined by the period of the time cells defined by PLL 88 with the frequency of the output signal V(t) in a short time (S134). After a lapse of the predetermined time TR, since the arithmetic/comparison circuit 14 switched the feedback gain of PLL 88 to High (S136), the circuit 14 gives PLL 88 an instruction to operate at a feedback gain lower than the high gain (S138). The frequency determined by the time cells this time is synchronized with the frequency of the read signal.

Upon detection of the occurrence of offset in a state that both of the AGC circuit 82 and PLL 88 are respectively operating at low feedback gains (S142), the signal INVAL indicating binary data is invalid is sent from the arithmetic/comparison circuit 14 to the binarization circuit 26 (S144).

The binarization circuit 26 sends an error correcting code (ECC) and the signal INVAL together with the binary data to the decoder 22. An error correcting circuit 24 in the decoder 22 corrects errors in the binary data using ECC and INVAL.

Upon detection of the convergence of offset in a state that the AGC circuit 82 and PLL 88 are respectively operating at low feedback gains (S132), the arithmetic/comparison circuit 14 gives PLL 88 an instruction to operate at a feedback gain higher than the low gain (S134). The binary date becomes valid. The error between the frequency determined by the time cells and the frequency of the output signal V(t) is rapidly converged by operating PLL 88 at a high feedback gain. After the predetermined time has elapsed (S136), PLL 88 operates at a low feedback gain (S138). After the completion of reading data from the medium 72 (S140), the processing shown in FIG. 4 has been completed.

As described above, one embodiment according to the present invention has been described so far, but the present invention is not limited to this embodiment. For example, in a flow chart shown in FIG. 4, the frequency error in PLL 88 (S134, S136) is converged after converging the amplitude error in the AGC circuit 82, but it is also possible to converge the amplitude error in the AGC circuit 82 and the frequency error in PLL 88 at almost the same time.

For a general data reproduction apparatus, an AGC circuit may often adjust the amplitude of an output signal V(t) to a predetermined amplitude A0 during only an early stage of operation. It is also possible to change the feedback gain of an AGC circuit using a timer circuit as in a conventional data reproduction apparatus.

In the flow chart shown in FIG. 3, although the occurrence and converge of offset has been detected based on comparison values obtained three times in the past, it is not limited to the past three times but it is possible to detect the occurrence and convergence of offset based on any number of comparison values. The conditions of occurrence of offset are not limited to twice out of three times either, but any number may be used. The conditions of convergence of offset are not limited to the entire three times, but any number may be adopted.

As described above, specific embodiments of the present invention have been variously described so far, but the present invention is not limited to these embodiments. Also, any modification, variations or equivalent arrangements which may occur to those skilled in the art should be considered to be within the scope of the invention.

There have thus been shown and described a novel data reproduction apparatus and a novel data reproducing method, which fulfill all the objects and advantages sought therefor. Many changes, modifications, variations, combinations, and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. An apparatus for reproducing data, said apparatus comprising;
   an automatic gain control circuit for retaining the amplitude of a read signal read from a data recording medium at a predetermined amplitude;
   a zero cross detector for detecting a first intersection of an output signal outputted from the automatic gain control circuit and a predetermined threshold level;
   a phase-locked loop circuit for defining time cells having a period determined by the frequency of the output signal;
   a binarization circuit for generating binary data based on presence or absence of the first intersection in each time cell;
   a decoder for decoding the binary data;
   a differentiating circuit for second-order differentiating the output signal outputted from the automatic gain control circuit;
   an arithmetic circuit for determining a time difference between a second intersection of the signal from the differentiating circuit and a zero level, and the first intersection;
   a comparison circuit for comparing the determined time difference with a predetermined time to obtain a comparison value; and
   means responsive to the comparison circuit for controlling the setting of a rate of convergence for an error between the amplitude of the output signal from the automatic gain control circuit and the predetermined amplitude, and the setting of a rate of convergence between the frequency determined by the period of the time cell defined by the phase-locked loop circuit and the frequency of the output signal from the automatic gain control circuit, said means for controlling including:
      means for detecting an occurrence of offset of a read signal based on a comparison value obtained by said comparison circuit, said means for detecting an occurrence of offset including:
         means for storing comparison values obtained in previous n comparisons, where n is an integer of 1 or more, by said comparison circuit; and
         means for checking the number of those comparisons out of (n+1) comparisons including a current comparison and previous n comparisons which indicate that said time difference is longer than said predetermined time;
      means for detecting a convergence of offset of a read signal based on the comparison value obtained by the comparison circuit; and
      means for giving an instruction to control respective rates of convergence for errors in said automatic gain control circuit and said phase-locked loop circuit upon detection of the occurrence or the convergence of offset.

2. An apparatus for reproducing data, said apparatus comprising:
   an automatic gain control circuit for retaining the amplitude of a read signal read from a data recording medium at a predetermined amplitude;
   a zero cross detector for detecting a first intersection of an output signal outputted from the automatic gain control circuit and a predetermined threshold level;
   a phase-locked loop circuit for defining time cells having a period determined by the frequency of the output signal;
   a binarization circuit for generating binary data based on presence or absence of the first intersection in each time cell;
   a decoder for decoding the binary data;
   a differentiating circuit for second-order differentiating the output signal outputted from the automatic gain control circuit;
   an arithmetic circuit for determining a time difference between a second intersection of the signal from the differentiating circuit and a zero level, and the first intersection;

a comparison circuit for comparing the determined time difference with a predetermined time to obtain a comparison value; and means responsive to the comparison circuit for controlling the setting of a rate of convergence for an error between the amplitude of the output signal from the automatic gain control circuit and the predetermined amplitude, and the setting of a rate of convergence between the frequency determined by the period of the time cell defined by the phase-locked loop circuit and the frequency of the output signal from the automatic gain control circuit, said means for controlling including:

means for detecting an occurrence of offset of a read signal based on a comparison value obtained by said comparison circuit;

means for detecting a convergence of offset of a read signal based on the comparison value obtained by the comparison circuit, said means for detecting said convergence including:

means for storing comparison values obtained in previous n times comparisons by said comparison circuit; and means for checking the number of those comparisons out of (n+1) comparisons including a current comparison and previous n comparisons which indicate that said time difference is shorter than said predetermined time; and means for giving an instruction to control respective rates of convergence for errors in said automatic gain control circuit and said phase-locked loop circuit upon detection of the occurrence or the convergence of offset.

3. An apparatus for reproducing data, said apparatus comprising:

an automatic gain control circuit for retaining the amplitude of a read signal read from a data recording medium at a predetermined amplitude;

a zero cross detector for detecting a first intersection of an output signal outputted from the automatic gain control circuit and a predetermined threshold level;

a phase-locked loop circuit for defining time cells having a period determined by the frequency of the output signal;

a binarization circuit for generating binary data based on presence or absence of the first intersection in each time cell;

a decoder for decoding the binary data;

a differentiating circuit for second-order differentiating the output signal outputted from the automatic gain control circuit;

an arithmetic circuit for determining a time difference between a second intersection of the signal from the differentiating circuit and a zero level. and the first intersection;

a comparison circuit for comparing the determined time difference with a predetermined time to obtain a comparison value; and means responsive to the comparison circuit for controlling the setting of a rate of convergence for an error between the amplitude of the output signal from the automatic gain control circuit and the predetermined amplitude, and the setting of a rate of convergence between the frequency determined by the period of the time cell defined by the phase-locked loop circuit and the frequency of the output signal from the automatic gain control circuit, said means for controlling including:

means for detecting an occurrence of offset of a read signal based on a comparison value obtained by said comparison circuit;

means for detecting a convergence of offset of a read signal based on the comparison value obtained by the comparison circuit; and means for giving an instruction to control respective rates of convergence for errors in said automatic gain control circuit and said phase-locked loop circuit upon detection of the occurrence or the convergence of offset, said means for giving an instruction including:

means for giving the automatic gain control circuit an instruction to decrease the error convergence rate in the automatic gain control circuit when the convergence of offset is detected while the error convergence rate is set high;

means for giving the phase-locked loop circuit an instruction to decrease the error convergence rate in the phase-locked loop circuit after a lapse of a predetermined time since the error convergence rate in the phase-locked loop circuit has been set high; and means for giving the phase-locked loop circuit an instruction to increase the error convergence rate in the phase-locked loop circuit when the convergence of offset is detected while the error convergence rates in the automatic gain control circuit and the phase-locked loop circuit are set low.

4. The apparatus according to claim 3, wherein said means for controlling further comprises means for sending said binarization circuit a signal indicating binary data is invalid from a time when offset has occurred while the error convergence rates of the automatic gain control circuit and the phase-locked loop circuit are set low to a time when the offset has converged.

5. An apparatus for reproducing data, said apparatus comprising;

an automatic gain control circuit for retaining the amplitude of a read signal read from a data recording medium at a predetermined amplitude, said automatic gain control circuit including means for nullifying detection of said second intersection based on a waveform of the read signal;

a zero cross detector for detecting a first intersection of an output signal outputted from the automatic gain control circuit and a predetermined threshold level;

a phase-locked loop circuit for defining time cells having a period determined by the frequency of the output signal;

a binarization circuit for generating binary data based on presence or absence of the first intersection in each time cell;

a decoder for decoding the binary data;

a differentiating circuit for second-order differentiating the output signal outputted from the automatic gain control circuit;

an arithmetic circuit for determining a time difference between a second intersection of the signal from the differentiating circuit and a zero level, and the first intersection;

a comparison circuit for comparing the determined time difference with a predetermined time to obtain a comparison value; and means responsive to the comparison circuit for controlling the setting of a rate of convergence for an error between the amplitude of the output signal from the automatic gain control circuit and the predetermined amplitude, and the setting of a rate of convergence between the frequency determined by the period of the time cell defined by the phase-locked loop circuit and the frequency of the output signal from the automatic gain control circuit.

6. A method for reproducing data, said method comprising;

controlling an amplitude of a read signal read from a data recording medium by an automatic gain control circuit to retain the amplitude of the read signal at a predetermined amplitude circuit;

detecting a first intersection of an output signal outputted from the automatic gain control circuit and a predetermined threshold level;

defining time cells having a period determined by a frequency of the output signal;

generating binary data based on presence or absence of the first intersection in each time cell;

decoding the binary data;

second-order differentiating the output signal from the automatic gain control circuit;

detecting a second intersection of the second-order differentiated signal and a zero level;

determining a time difference between the first intersection and the second intersection;

comparing the determined time difference with a predetermined time to obtain a comparison value; and controlling a rate of convergence for an error between the amplitude of the output signal from the automatic gain control circuit and the predetermined amplitude, and a rate of convergence between the frequency determined by the period of the time cell and the frequency of the output signal from the automatic gain control circuit based on the comparison value, said controlling said rate of convergence including:

detecting an occurrence of offset of a read signal based on a comparison value obtained by comparing the time difference between the first intersection and the second intersection with the predetermined time, wherein said step of detecting an occurrence of offset includes the steps of:

checking a comparison which indicates that a time difference between the first intersection and the second intersection is longer than a predetermined time; and detecting an occurrence of offset when a predetermined number of comparisons are performed;

detecting a convergence of offset of a read signal based on a comparison value obtained by comparing the time difference with the predetermined time; and giving an instruction to control respective rates of convergence for errors in the amplitude and the frequency upon detection of the occurrence or the convergence of offset.

7. A method for reproducing data, said method comprising:

controlling an amplitude of a read signal read from a data recording medium by an automatic gain control circuit to retain the amplitude of the read signal at a predetermined amplitude circuit;

detecting a first intersection of an output signal outputted from the automatic gain control circuit and a predetermined threshold level;

defining time cells having a period determined by a frequency of the output signal;

generating binary data based on presence or absence of the first intersection in each time cell;

decoding the binary data;

second-order differentiating the output signal from the automatic gain control circuit;

detecting a second intersection of the second-order differentiated signal and a zero level;

determining a time difference between the first intersection and the second intersection;

comparing the determined time difference with a predetermined time to obtain a comparison value; and controlling a rate of convergence for an error between the amplitude of the output signal from the automatic gain control circuit and the predetermined amplitude, and a rate of convergence between the frequency determined by the period of the time cell and the frequency of the output signal from the automatic gain control circuit based on the comparison value, said controlling said rate of convergence including:

detecting an occurrence of offset of a read signal based on a comparison value obtained by comparing the time difference between the first intersection and the second intersection with the predetermined time;

detecting a convergence of offset of a read signal based on a comparison value obtained by comparing the time difference with the predetermined time, wherein said step of detecting a convergence of offset includes the steps of:

checking a number of comparisons which indicate that a time difference is shorter than a predetermined time; and detecting a convergence of offset when a predetermined number of comparisons are performed; and giving an instruction to control respective rates of convergence for errors in the amplitude and the frequency upon detection of the occurrence or the convergence of offset.

8. A method for reproducing data, said method comprising:

controlling an amplitude of a read signal read from a data recording medium by an automatic gain control circuit to retain the amplitude of the read signal at a predetermined amplitude circuit;

detecting a first intersection of an output signal outputted from the automatic gain control circuit and a predetermined threshold level;

defining time cells having a period determined by a frequency of the output signal;

generating binary data based on presence or absence of the first intersection in each time cell;

decoding the binary data;

second-order differentiating the output signal from the automatic gain control circuit;

detecting a second intersection of the second-order differentiated signal and a zero level;

determining a time difference between the first intersection and the second intersection;

comparing the determined time difference with a predetermined time to obtain a comparison value; and controlling a rate of convergence for an error between the amplitude of the output signal from the automatic gain control circuit and the predetermined amplitude, and a rate of convergence between the frequency determined by the period of the time cell and the frequency of the output signal from the automatic gain control circuit based on the comparison value, said controlling said rate of convergence including:

detecting an occurrence of offset of a read signal based on a comparison value obtained by comparing the time difference between the first intersection and the second intersection with the predetermined time;

detecting a convergence of offset of a read signal based on a comparison value obtained by comparing the time difference with the predetermined time; and giving an instruction to control respective rates of convergence for errors in the amplitude and the frequency upon detection of the occurrence or the convergence of offset, wherein said step of giving an instruction includes the steps of:

giving an instruction to decrease the amplitude error convergence rate when the convergence of offset is detected while the amplitude error convergence rate is set high;

giving an instruction to decrease the frequency error convergence rate after a lapse of a predetermined time since the frequency error convergence rate has been set high; and giving an instruction to increase the frequency error convergence rate when the convergence of offset is detected while the amplitude and frequency error convergence rates are set low.

9. The method according to claim 8, further including the step of generating a signal to indicate that the binary data is invalid from a time of an occurrence of offset while the amplitude and frequency error convergence rates are set low to the time of the convergence of offset.

10. A method for reproducing data, said method comprising:

controlling an amplitude of a read signal read from a data recording medium by an automatic gain control circuit to retain the amplitude of the read signal at a predetermined amplitude circuit;

detecting a first intersection of an output signal outputted from the automatic gain control circuit and a predetermined threshold level;

defining time cells having a period determined by a frequency of the output signal;

generating binary data based on presence or absence of the first intersection in each time cell;

decoding the binary data;

second-order differentiating the output signal from the automatic gain control circuit;

detecting a second intersection of the second-order differentiated signal and a zero level;

determining a time difference between the first intersection and the second intersection;

comparing the determined time difference with a predetermined time to obtain a comparison value;

controlling a rate of convergence for an error between the amplitude of the output signal from the automatic gain control circuit and the predetermined amplitude, and a rate of convergence between the frequency determined by the period of the time cell and the frequency of the output signal from the automatic gain control circuit based on the comparison value; and nullifying the detected second intersection according to noise of the read signal.

* * * * *